US012689437B2

(12) United States Patent
Baltz et al.

(10) Patent No.: US 12,689,437 B2
(45) Date of Patent: Jul. 21, 2026

(54) OPTICAL COMMUNICATION DEVICE WITH OPTICAL SLIP RING

(71) Applicant: NORTHROP GRUMMAN SYSTEMS CORPORATION, Falls Church, VA (US)

(72) Inventors: Ethan Karl Christian Baltz, Palatine, IL (US); Justin Stewart Grayer, Libertyville, IL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 280 days.

(21) Appl. No.: 18/447,436

(22) Filed: Aug. 10, 2023

(65) Prior Publication Data

US 2025/0055567 A1     Feb. 13, 2025

(51) Int. Cl.
*H04B 10/114* (2013.01)
(52) U.S. Cl.
CPC .................................. *H04B 10/114* (2013.01)
(58) Field of Classification Search
CPC .................................................... H04B 10/114
See application file for complete search history.

(56) References Cited

U.S. PATENT DOCUMENTS 6,310,729 B1 * 10/2001 Tsukamoto ............ G02B 5/285
359/583
7,569,824 B2   8/2009 Gidseg et al.
7,667,190 B2   2/2010 Mills et al.
8,986,922 B1   3/2015 Wach
2003/0002822 A1 * 1/2003 Ishihara ............... G02B 6/4246
385/36

(Continued)

FOREIGN PATENT DOCUMENTS

CN       110417466 B     2/2021
EP        1629299 B1    11/2010

(Continued)

OTHER PUBLICATIONS

EESR: "Extended European Search Report" issued for corresponding EP 24192072.7-1206, issued on Jan. 8, 2025.

(Continued)

*Primary Examiner* — Junpeng Chen
(74) *Attorney, Agent, or Firm* — Tarolli, Sundheim, Covell & Tummino LLP

(57)     ABSTRACT

An optical data transmission device for providing optical signals containing information data between avionics systems in an aircraft. A fixed optical transceiver array at a first side of a slip ring is in optical communication with a revolving optical transceiver array positioned at a second side of the slip ring. A set of mirrors coated with dielectric material are positioned at the central axis of the slip ring and configured to maintain optical communication between the optical transceiver arrays. The first mirror is fixed at the first side of the slip ring. The second mirror positioned at the second side of the slip ring rotates in concert with the second transceiver array. The mirrors are formed of a material allowing optical signals to be reflected by the mirrors while concurrently allowing a laser beam of an external system to pass through the mirrors and maintain travel along a linear axis.

20 Claims, 4 Drawing Sheets

(56) References Cited

U.S. PATENT DOCUMENTS

| 2006/0188196 A1* | 8/2006 | Charters | ............. | G02B 6/1221 |
| | | | | 385/32 |
| 2006/0280411 A1* | 12/2006 | Nishizawa | ........... | G02B 6/4246 |
| | | | | 385/94 |
| 2009/0103923 A1* | 4/2009 | Hosomi | ............... | G02B 6/4215 |
| | | | | 398/91 |
| 2023/0087121 A1 | 3/2023 | Yabashi | | |

FOREIGN PATENT DOCUMENTS

| EP | 1946350 | 11/2013 |
| GB | 2163617 A | 2/1986 |

OTHER PUBLICATIONS

Herbert: "High Capacity Digital Beam Steering Technology"; (2013) LSU Doctoral Dissertations 1824. https://digitalcommons.lsu.edu/gradschool_dissertations/1824.

* cited by examiner

400

406

408

404

410

402

OPTICAL COMMUNICATION DEVICE WITH OPTICAL SLIP RING

GOVERNMENT INTEREST

The invention was made under Government Contract. Therefore, the US Government has rights to the invention as specified in that contract.

TECHNICAL FIELD

This description relates to an optical communication device that includes an optical slip ring to facilitate optical communication between optical transceivers.

BACKGROUND

Infrared countermeasures are a class of aircraft survivability equipment designed to protect rotary and fixed-wing aircraft from infrared guided missiles. In a directional infrared countermeasure system, the energy source is mounted in a strategically located movable laser turret that functions when the aircraft's missile warning system warns of a missile launch. The directional infrared countermeasure system then targets the missile's heat plume to accurately focus a pulsing IR beam at the missile and jams its IR tracking ability.

Countermeasure systems are usually integrated into the aircraft, such as in the fuselage, wing, or nose of the aircraft, or fixed to an outer portion of the aircraft. Infrared seekers are designed to track a strong source of infrared radiation. IRCM systems are based on a source of infrared radiation with a higher intensity than the target. When this is received by a missile, it may overwhelm the original infrared signal from the aircraft and provide incorrect steering cues to the missile. The missile may then deviate from the target.

By modulating the signal, the steering logic can tell where the infrared source of energy is relative to the missile direction of flight. The missile optics of the IRCM system will rotate and the rotating image is projected on a stationary reticle or a stationary set of detectors which generates a pulsed signal which is processed by the tracking logic. Depending on the orientation of the aircraft, the system may need to recalibrate. Traditional data transmission lines are prone to wear and tear when in a constant state of motion. Optical data transmission is more suitable for systems that incorporate two- or three-axis motion.

Slip rings are used wherever electric currents or signals need to be transmitted from a stationary machine element to a rotating shaft. Slip rings can have a central cavity and can allow laser beams to pass through uninterrupted. Furthermore, it can be necessary to have an optical data signal to be routed to a component while allowing the laser beam to pass through the same space. By incorporating coated mirrors, the slip ring can pass a laser beam while directing an optical data signal to a component.

SUMMARY

The following is a brief summary of subject matter that is described in greater detail herein. This summary is not intended to be limiting as to the scope of the claims.

In a first example, an optical transmission device includes an optical slip ring defining a central axis and having a cavity. The optical transmission device includes a first optical transceiver proximate a first side of the cavity of the optical slip ring for propagating a data signal at a first wavelength through the cavity of the optical slip ring. The optical transmission device includes a second optical transceiver proximate a second side of the cavity of the optical slip ring for propagating the data signal at the first wavelength, wherein the second optical transceiver revolves about the central axis of the optical slip ring on a gimbal assembly. The optical transmission device includes a first optical device arranged with a tilt angle relative to a first optical beam of the first optical transceiver and proximate to the first side of the cavity of the optical slip ring, wherein the first optical device is coated with a film for reflecting the data signal at a reflection angle. The optical transmission device includes a second optical device positioned at the tilt angle relative to a second optical beam of the second optical transceiver, wherein the second optical device rotates in relation to the revolving of the second optical transceiver, the second optical device is coated with the film for reflecting the data signal at the reflection angle to the first optical device, wherein the first optical transceiver is in optical communication with the second optical transceiver, and wherein an external light source propagates an external beam at a second wavelength through the cavity of the optical slip ring, wherein the external beam passes through the first optical device and the second optical device.

According to a second example, an optical transmission device includes an optical slip ring defining a central axis and having a cavity. The optical transmission device includes a first set of optical transceivers proximate a first side of the cavity of the optical slip ring for propagating three or more data signals through the cavity of the optical slip ring. The optical transmission device includes a second set of optical transceivers proximate a second side of the cavity of the optical slip ring for propagating the three or more data signals, wherein the second set of optical transceivers revolve about the central axis of the optical slip ring on a gimbal assembly. The optical transmission device includes a first optical device arranged with a tilt angle relative to a first set of optical beams of the first set of optical transceivers and proximate to the first side of the cavity of the optical slip ring, wherein the first optical device is coated with a film for reflecting the three or more data signals at a reflection angle. The optical transmission device includes a second optical device positioned at the tilt angle relative to a second set of optical beams of the second set of optical transceivers, wherein the second optical device rotates in relation to the revolving of the second set of optical transceivers, the second optical device is coated with the film for reflecting the three or more data signals at the reflection angle to the first optical device, wherein the first set of optical transceivers is in optical communication with the second set of optical transceivers, and wherein an external light source propagates a laser beam through the cavity of the optical slip ring, wherein the external beam passes through the first optical device and the second optical device.

In a third example, an avionics system includes a countermeasure component configured to propagate a laser beam from an aircraft. The avionics system includes an optical transmission component. The optical transmission component includes an optical slip ring defining a central axis and having a cavity. The optical transmission component includes a first optical transceiver proximate a first side of the cavity of the optical slip ring for propagating a data signal through the cavity of the optical slip ring. The optical transmission component includes a second optical transceiver proximate a second side of the cavity of the optical slip ring for propagating the data signal, wherein the second optical transceiver revolves about the central axis of the optical slip ring on a gimbal assembly. The optical transmission component includes a first optical device arranged with a tilt angle relative to a first optical beam of the first optical transceiver and proximate to the first side of the cavity of the optical slip ring, wherein the first optical device is coated with a film for reflecting the data signal at a reflection angle. The optical transmission component includes a second optical device positioned at the tilt angle relative to a second optical beam of the second optical transceiver, wherein the second optical device rotates in relation to the revolving of the second optical transceiver, the second optical device is coated with the film for reflecting the data signal at the reflection angle to the first optical device, wherein the first optical transceiver is in optical communication with the second optical transceiver, and wherein the laser beam passes through the cavity of the optical slip ring, wherein the laser beam passes through the first optical device and the second optical device.

BRIEF SUMMARY OF THE DRAWINGS

The general inventive concepts, as well as illustrative examples and advantages thereof, are described below in greater detail, by way of example, with reference to the drawings in which.

DETAILED DESCRIPTION

This disclosure relates generally to optical communications, and more specifically to an optical data transmission device. As an example, the optical data transmission device can correspond to an optical slip ring that includes a pair of optical transceiver arrays in optical communication by transmitting optical information data through a cavity of the optical slip ring. The optical data transmission device also includes a pair of mirrors coated with dielectric material to enable the optical data information to be reflected between the corresponding optical transceiver arrays. The optical data transmission device is configured to have the first optical transceiver array to be in a fixed position at a first side of the optical slip ring. The second optical transceiver revolves on a gimbal assembly around the second side of the optical slip ring to adjust to the orientation of the optical transceiver device positioned inside of a turret. The first mirror is positioned at the first side of the optical slip ring for reflecting optical information data to the second mirror. The second mirror positioned at the second side of the optical slip ring rotates in concert with the revolving second optical transceiver array to reflect the optical information data of the first optical transceiver array and vice versa.

The optical transmission device is configured to receive a laser beam propagated from an external system. The external system can be any system that propagates a laser beam (e.g., countermeasures, weapons, communications, etc.) The mirrors of the optical transmission device is formed of a material that reflects the optical information data while concurrently allowing the laser beam to pass through the cavity of the optical slip ring unobstructed without deformation or loss of the laser beam.

To mitigate deviation of the optical information data being reflected by the mirrors, the mirrors can be adjusted to correct such deviation. In one example, the mirrors can be adjusted off the central axis of the optical slip ring to adjust the reflection angle between the pair of mirrors. In another example, the tilt of the mirrors can be adjusted to maintain a 90 degree angle of refraction to the optical transceiver arrays. The optical transceiver arrays can be configured to propagate a diverging beam of optical information data to aid in the receiving of the optical information data. The optical transceiver arrays can also be configured to form a collimator of the optical information data to optimize the optical communication between the pair of optical transceiver arrays.

Figure 1:
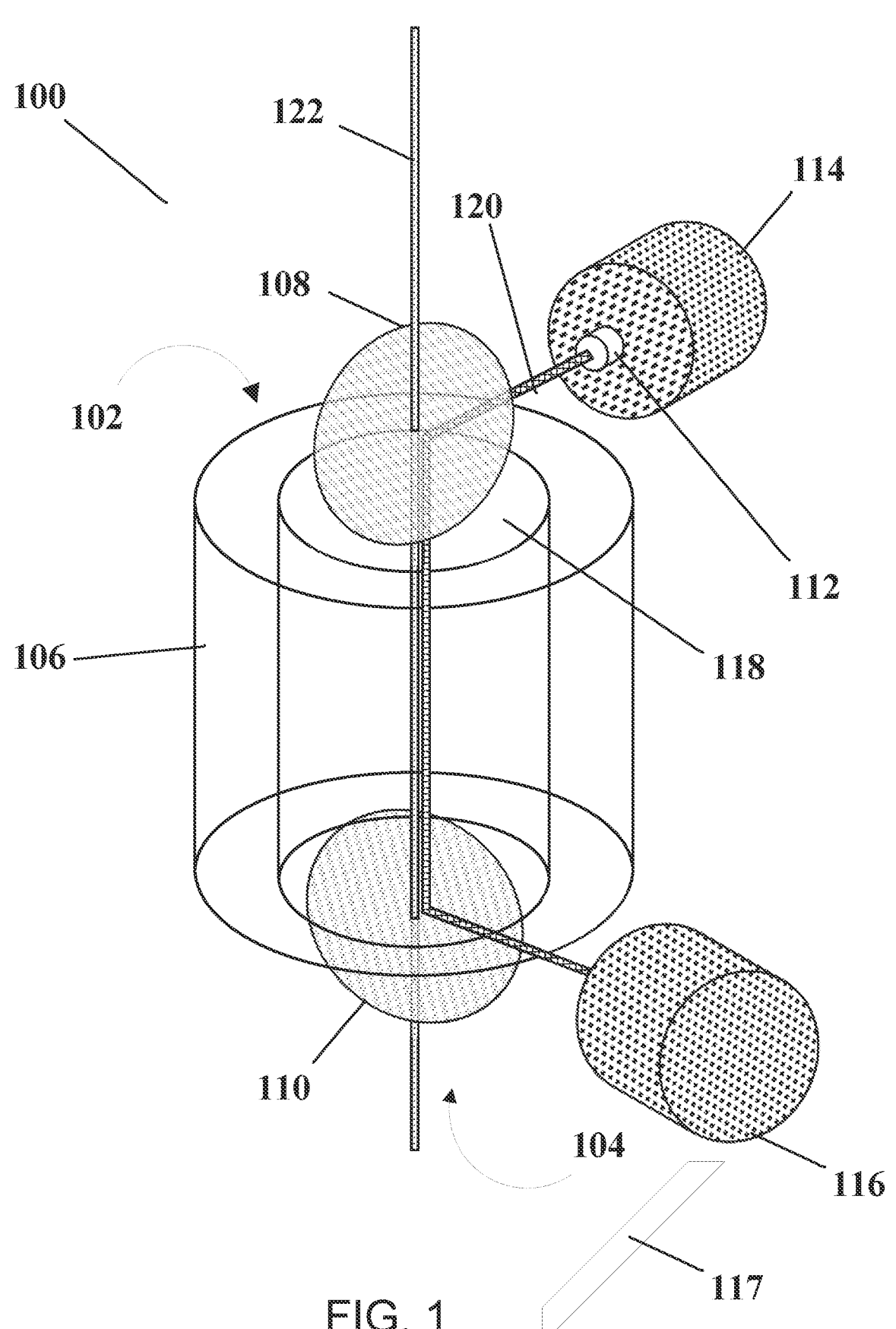
FIG. 1 illustrates a perspective view of an optical data transfer device.

Referring to FIG. 1, there is illustrated a perspective view of an optical data transmission device 100 that can be used to enable contemporaneous transmission of two different signals that are transmitted in part along an overlapping segment of the two signals. The optical data transmission device is used to avoid the need for a conductive current path between electrical components mounted proximate to a first side 102 of the optical data transmission device 100 and a second side 104 of the optical data transmission device 100. As shown, the optical data transmission device 100 includes a slip ring 106 having a cylindrical shape and a hollow cavity in the center region of the slip ring 106, a first mirror 108, a second mirror 110, a first optical transceiver 112 positioned on a printed circuit board of the first transceiver mount 114, and a second transceiver positioned on a printed circuit board of the second transducer mount 116. The first optical transceiver 112 is mounted to be stationary relative to the slip ring 106. The second optical transceiver (hidden from view) rotates on a gimbal assembly 117 relative to the first optical transceiver 112.

As shown in FIG. 1, the slip ring 106 is generally a cylindrical structure having a cavity 118 extending from the first side 102 of the optical data transmission device 100 through to the second side 104 of the optical data transmission device 100. The slip ring 106 defines a central axis and provides a passageway through which a first signal 120 at a first wavelength and a second signal 122 at a second wavelength can be propagated. The slip ring 106 is a rotary electrical interface that provides the transmission of power and electrical signals to the transceiver mounts (114, 116). The slip ring 106 is a rotary electrical switch that periodically reverses the current direction to produce a steady rotation force for the second transceiver mount 116 to revolve around the central axis of the optical data transmission device 100 about the second side 104.

The optical data transmission device 100 provides data transmission to systems regardless of the orientation. By providing a cavity 118, the optical data transmission device 100 can transmit a first signal 120 representative of information data while allowing an overlapping second signal representative of a jamming laser beam to pass without obstruction.

The transceiver mounts (114, 116) are configured to be an electronics package including a bi-directional optical transceiver 112 having a laser device and a light detector. The laser device is driven by a laser driver to emit light at a wavelength in response to receiving a differential transmit signal at a data input terminal from an associated line replaceable unit via a transmit electrical signal line. As used herein, the term "wavelength" in the context of coherent laser light refers to the center wavelength of the laser light with a narrow spectral width. The laser driver includes circuitry within the transceiver mounts (114, 116) that converts those electrical differential signals into electrical digital signals representing data to be transmitted by the optical transceiver 112. Conversely, the optical transceiver 112 receives light and converts the detected light into an electrical signal, which is supplied to a receiving circuit of the transceiver mounts (114, 116) that includes an amplifier that amplifies the detected signal and a limiting amplifier that performs digitization on the signal. The receive circuitry of the transceiver mounts (114, 116) converts those signals into digital electrical differential receive signals that represent the received data.

The first optical transceiver 112 and first transceiver mount 114 are configured in a fixed position perpendicular to the central axis of the slip ring 106. The first optical transceiver 112 can be within the same housing of the slip ring 106 or it can be mounted to an external component or structure allowing for an external line replaceable unit (LRU) to be in optical communication with the optical data transmission device 100. The optical transceiver 112 is 5 millimeters cubed or less in size, not including the transceiver mount 114.

The first optical transceiver 112, positioned at the first side 102 of the optical data transmission device 100, propagates a first signal 120 on a horizontal plane towards a first mirror 108 substantially angled and positioned at the first side 102 of the optical data transmission device 100 to reflect the first signal 120 at a 90 degree angle towards the second mirror 110 substantially angled and positioned at the second side 104 of the optical data transmission device 100 to reflect the first signal 120 at a 90 degree angle towards the second optical transceiver of the second transceiver mount 116 positioned at the second side 104 of the optical data transmission device 100 so that the first optical transceiver 112 and the second optical transceiver are in optical communication independent from a rotational state.

The mirrors (108, 110) of the optical data transmission device 100 are configured to receive and redirect the first signal 120 from the first optical transceiver 112 to the second optical transceiver and vice versa. The position of the reflective portion of the mirrors (108, 110) is adjustable to affect the angle of incidence of the beam of the first signal 120. For example, instead of fixed reflectors such as a prism, mirror, or polished fiber tip, the integrated optical assembly can include adjustable mirrors (108, 110) for redirecting the first signal 120 on the transceivers.

The mirrors (108, 110) can be adjusted to be positioned off the central axis of the optical slip ring 106 to accommodate for a deviation due to the refraction of the first signal 120. The adjustable mirrors (108, 110) can be a micro-electromechanical system (MEMS) that can be adjusted using, for example, an electrostatic actuator controlled by a controller using feedback from a monitor photodiode. A calibration signal is propagated from the first optical transceiver 112 and the second optical transceiver and vice versa to fine tune the position of the mirrors (108, 110) to obtain the optimal position for optical communication between the optical transceivers.

The substrate for the mirrors (108, 110) is glass (e.g., calcium fluoride, sapphire). The substrate is coated with a film of dielectric material (e.g., silicone dioxide). Moreover, the coating of the mirrors (108, 110) is selected to curtail deviation of the first signal 120. The mirrors (108, 110) are made of a stack of alternating materials having a thickness of 0.25 and 0.50 of a wavelength of the first signal 120 based on the index of refraction required to reflect the first signal

120. In another example, the mirrors (108, 110) include a diffractive element to deflect the wave propagation of the first signal 120 at a precise angle. It will be understood that the coating of the mirrors (108, 110) has the same index of refraction. In a further example, the mirrors (108, 110) are formed with metamaterials (e.g., meta-atom) to allow the second signal 122 to pass through while achieving the desired reflection of the first signal 120.

The second signal 122 is a laser beam propagated from an external system along the central axis of the slip ring 106, such that the second signal 122 provided from an external light source. The second signal passes through the cavity 118 of the optical data transmission device 100. While the mirrors (108, 110) are configured to reflect the first signal 120 at a first wavelength, the mirrors (108, 110) are configured to concurrently allow for the second signal 120 at a second wavelength to pass through and maintain a substantially linear path. Frequency selective surface-based metamaterials reflect signals in one band and pass those at another band. The mirrors (108, 110) can be made of metamaterials to allow the optical transceivers to remain in optical communication passing data encoded on the first signal 120 while the laser beam of the second signal 122 overlaps the first signal 120 through the cavity 118 of the slip ring 106 along the central axis.

Laser beams can be pointed using a number of methods and mechanisms, some which allow aligning the laser beam with a sensor-determined direction. Among these are methods using turrets and/or one or more two- or three-axis gimbal arrays. Constant motion of a gimbaled turret or the normal changing of orientation of the optical data transmission device 100 causes the angle of which the data information of the first signal 120 may need to be propagated. Pitch, yaw, and roll movements could cause a deviation in the transmission of the data signal. The second mirror 110 and the second transceiver mount 116 including the second transceiver are adjusted so that the first optical transceiver 112 and the second optical transceiver can remain in optical communication.

The first optical transceiver 112 can remain in optical communication with the second optical transceiver while in motion by revolving the second transceiver mount 116 about the central axis of the second side 104 of the optical data transmission device 100. The second transceiver mount 116 can be affixed to a gimbal assembly 117 which adjusts the radial position based on the orientation of the optical data transmission device 100 due to the movement of a turret and/or a change in orientation of the optical data transmission device 100. The revolving motion of the second transceiver mount 116 allows the second optical transceiver affixed to the second transceiver mount 116 to traverse the radial plane to obtain a tuned position for optical communication with the first optical transceiver 112 affixed to the first transceiver mount 114 which remains in a fixed position.

As the second transceiver mount 116 revolves around the central axis of the slip ring 106, the second mirror 110, positioned at the central axis of the slip ring 106, remains at the second side 104 of the optical data transmission device 100 to continuously face the second optical transceiver by rotating in concert with the revolution of the second transceiver mount 116. The second mirror 110 can be framed by a mount structure and affixed to a spindle structure which facilitates the rotation of the second mirror 110. The spindle structure is configured to mechanically rotate the second mirror without obstructing the second signal 122 that passes through the second mirror 110. The first mirror 108 is framed by a mount structure which allows the first mirror 108 to reflect the first signal 120 at a 90 degree angle. The second mirror 110 can reflect the first signal 120 at a 90 degree angle to the second optical transceiver at any position along the radial path of the second transceiver mount 116. The first signal 120 can conversely be propagated by the second optical transceiver at any position of the radial path of the second transceiver mount 116 to be reflected at a 90 degree angle to the first mirror 108, reflected at a 90 degree angle off the first mirror 108, and received by the first optical transceiver 112. The second signal 122 propagated by an external component can pass through both the first mirror 108 and the second mirror without obstruction.

Figure 2:
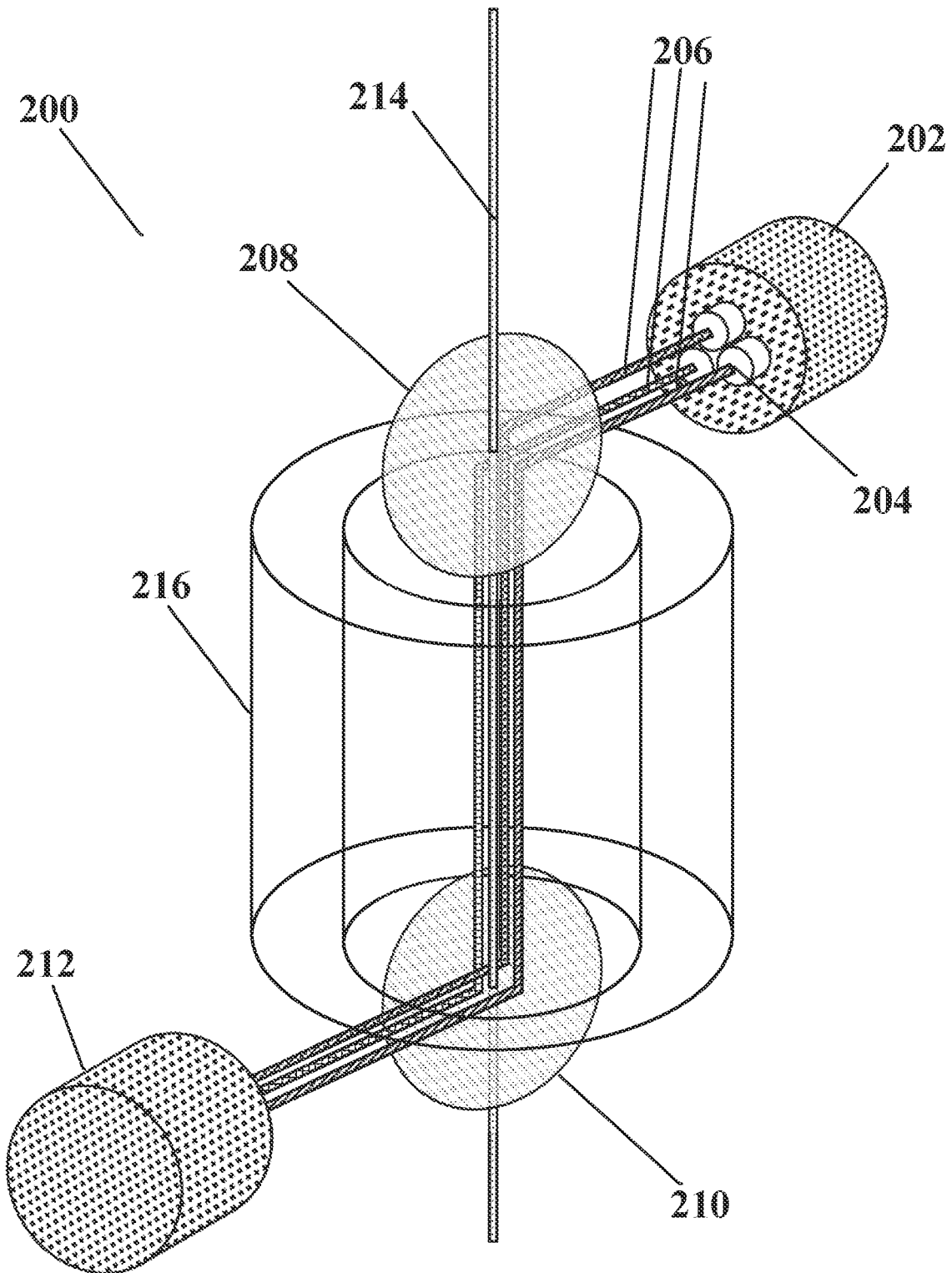
FIG. 2 illustrates a perspective view of a three beam optical data transfer device.

FIG. 2 illustrates an optical data transmission device 200 that includes a first transceiver mount 202 having a first optical transceiver array 204 made of three or more optical transceivers. The first optical transceiver array 204 can propagate three or more beams of information data signals 206. The information data signals 206 can contain data from one or more external systems (e.g., navigation, flight controls, countermeasures, power, etc.) The information data signals are propagated within a frequency band that can be reflected at a 90 degree angle by a first mirror 208 to be reflected at a 90 degree angle by a second mirror 210 and received by a second optical transceiver array (hidden from view) that is mounted on a second transceiver mount 212. The second optical transceiver array includes three or more optical transceivers that are in optical communication with the first optical transceiver array 204.

A laser beam 214 is propagated by an external component at a wavelength that can pass through the mirrors (208, 210) along the central axis of the slip ring 216. The laser beam 214 travels along the central axis of the slip ring concurrently with the information data signals 206. It will be understood that the mirrors (208, 210) are constructed from a material that can reflect the information data signals 206 of a first frequency band while concurrently allowing the laser beam 214 of a second frequency band to pass through the mirrors (208, 210.) The mirrors (208, 210) are mounted by a framing structure which allows the laser beam 214 to pass through the mirrors (208, 210) unobstructed. That is, the second mirror 210 rotates in place to continually face the second transceiver mount 212 as it revolves around the central axis of the slip ring 216 so that the first optical transceiver array 204 mounted on the first transceiver mount 202 to remain in optical communication with the second optical transceiver array mounted on the second transceiver mount 212 regardless of the position on the radial path of the second transceiver mount 212.

Each transceiver of the first optical transceiver array 204 propagates a beam of information that corresponds to a specific external system. Each beam of the information data signals is reflected off the mirrors (208, 210) and can be received by any one of the second optical transceiver arrays positioned on the second transceiver mount 212. As the second transceiver mount 212 is in motion the beams of the information data signals 206 may lead or lag depending on factors (e.g., index of refraction, mirror tilt, transceiver mount position, etc.) The mirrors (208, 210) are configured to adjust the tilt to maintain a reflection angle of 90 degrees.

As shown in FIG. 2, one or more of the beams of the information data signals 206 can travel along a path that is off of the central axis of the slip ring 216. The information data signals 206 can also expand as a result of travelling towards the receiving optical transceiver array. In one example, the mirrors (208, 210) can be adjusted along an XY axis to mitigate a loss of data transfer caused by a beam of the information data signals 206 straying out of optical communication between the optical transceiver arrays. In another example, the optical transceiver array 204 is configured to cause the information data signals 206 to converge into parallel beams to aid in the receiving by the receiving transceiver array.

Figure 3:
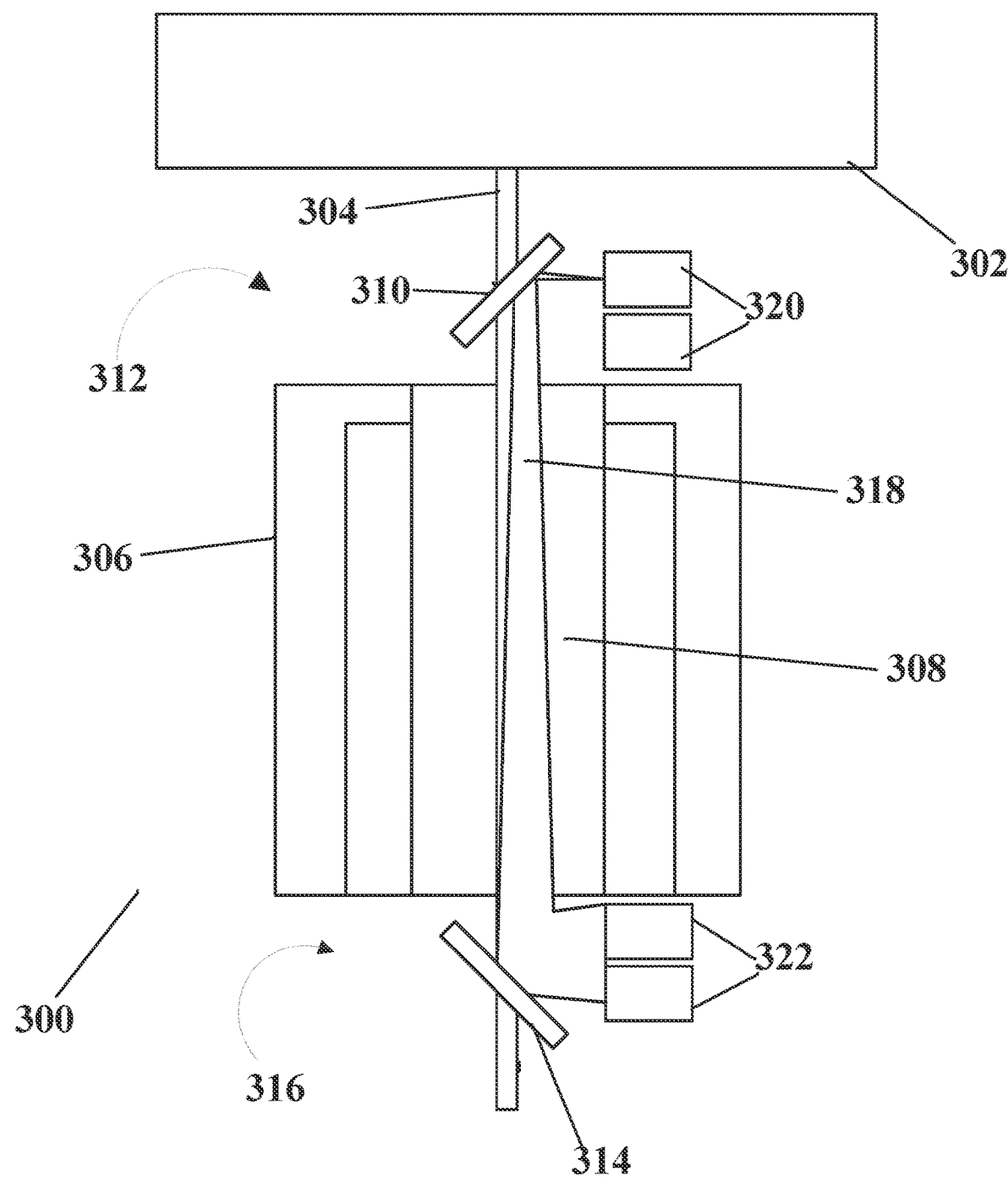
FIG. 3 illustrates a diagram of an optical data transfer device.

FIG. 3 illustrates a diagram of an avionics system 300. An avionics component 302 propagates a laser beam 304 along a linear axis. The laser beam travels through the central axis of a slip ring 306 having a hollow cavity 308. The first mirror 310 positioned at a first side 312 of the slip ring 306 and the second mirror 314 positioned at a second side of the slip ring 316 are configured to allow the laser beam 304 to pass through unobstructed. The laser beam 304 passes through the mirrors (310, 314) without degradation of the beam quality. The laser beam 304 does not encounter transverse spreading due to dispersion by passing through the mirrors (310, 314). The avionics system 300 can be located within a turret moving along an XYZ axis. As the turret adjusts its position, the laser beam is fired through the central axis of the slip ring 306 without deviation.

The avionics component 302 can be any system that has the necessity to propagate a laser beam 304 from an aircraft (e.g., countermeasure, weapons, navigations, communications). The mirrors (310, 314) can be configured to pass the laser beam 304 based on the laser beam 304 intensity requirements. The laser beam 304 propagated from a weapons system for combat purposes will have a much higher intensity than a laser beam 304 propagated from a navigation system for identification purposes. The mirrors (310, 314) can be formed from materials based on the requirements of the laser beam.

Optical signals 318 can be propagated from a first set of optical transceivers 320 to a second set of optical transceivers 322 that are in optical communication with one another. The optical signals are reflected off the first mirror 310 at a 90 degree angle, reflected off the second mirror 314 at a 90 degree angle and received by the second set of optical transceivers. The optical signal 318 travels along the central axis of the slip ring 306 concurrently with the laser beam 304. The laser beam 304 propagated at a first frequency band does not suffer from signal noise by the optical signals 318 propagated at a second frequency band and vice versa.

The optical signals 318 can be received by a plurality of optical transceivers of the sets of optical transceivers (320, 322). The mirrors (310, 314) can be configured to cause refraction of the optical signals 318 to achieve a desired level of dispersion. As the second set of optical transceivers 322 revolve around the central axis of the slip ring 306, a narrow beam may not always be sufficient for the sets of optical transceivers (320, 322) to remain in optical communication. The dispersion of the optical signals 318 are based on the index of refraction of the materials used to form the mirrors (310, 314). It will be understood that the mirrors (310, 314) are constructed to allow the laser beam 304 to pass without dispersion, deformation, or loss. Moreover, the mirrors (310, 314) cause an intentional level of dispersion on the reflected optical signals 318 to strengthen the optical communication between the sets of optical transceivers (320, 322).

As shown in FIG. 3, the mirrors (310, 314) are configured to have a tilt angle for reflecting the optical signals 318 at a 90 degree angle based on the propagation from the first set of optical transceivers 320 on a level plane with the first mirror 310. As stated above, the first set of optical transceivers 320 can be positioned within the same housing or the first set of optical transceivers 320 can be mounted outside of the housing on a structure or component located above the first side 312 of the slip ring 306. Thus, the mirrors (310, 314) can be configured at an optimal tilt angle for reflecting optical signals from an external component.

Figure 4:
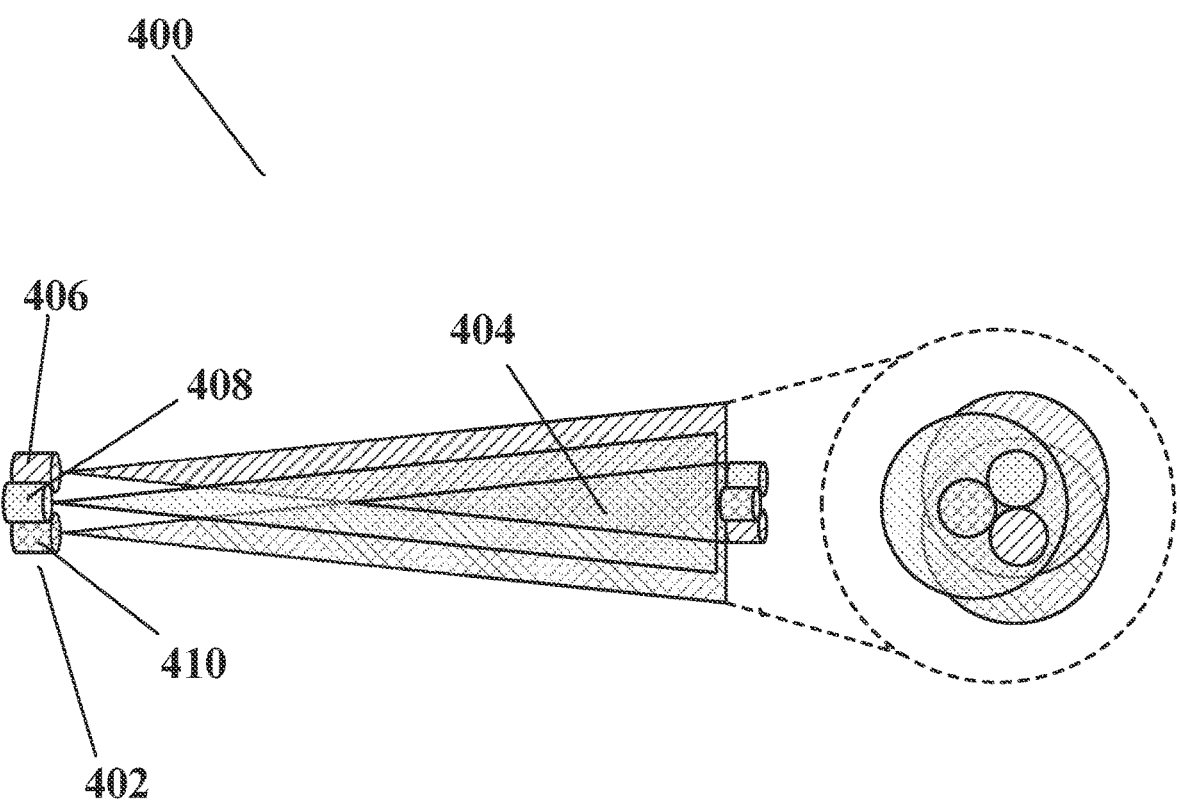
FIG. 4 illustrates a perspective view of an optical transceiver array propagating optical signals containing information data.

FIG. 4 shows a perspective view of an optical transceiver array propagating optical signals containing information data 400. FIG. 4 is an example for an optical transceiver array 402 causing the optical signals to converge, or which is able to receive diverging beams. In the arrangement of FIG. 4, an optical transceiver array 402 is shown with its respective one of optical transceivers (406, 408, and 410). The order in the optical path of the optical transceivers (406, 408, and 410) and the optical transceiver array 402, is not material. Thus, shown in FIG. 4 are optical signals along with the optical transceivers (406, 408, and 410) from which has been transmitted. This arrangement produces converging beams. Similarly, in the reverse direction beams of light that are diverging can be coupled into respective associated optical transceivers (406, 408, and 410). The degree of convergence is determined by the implementer.

The optical transceiver array 402 supplies optical signals 404 to be received by a receiving transceiver array. More specifically, each optical transceiver (406, 408, and 410) is an output port to the receiving transceiver array. The optical signals 404 supplied by each optical transceiver (406, 408, and 410) are reflected by the mirrors. A function of each optical transceiver (406, 408, and 410) is to collimate the optical signals 404 supplied from its respective optical transceiver (406, 408, and 410). An optical transceiver (406, 408, and 410) can be integrated in an arrangement that forms a collimator, so that the optical signals 404 come out as a parallel beam.

The optical signals 404 each fall upon the receiving optical transceiver array. The optical transmission device is arranged so as to cause information data of the optical transceiver array 402 and/or the collimator to be formed at the receiving optical transceiver array, or vice versa, due to the reversible nature of the optical transceiver arrays. The optical transceiver array 402 is further arranged to cause the optical signals 404 from each optical transceiver (406, 408, and 410) to be converging when the optical signals 404 are incident on the receiving optical transceiver array independent from the orientation upon reflection of the mirrors. Thus, advantageously, the optical signals 404, even if not traveling in its intended direction due to errors in the reflection angle off of the mirrors, is prevented from traveling away from an intended target of the respective optical signals 404 and furthermore, the optical signals 404 are oriented so as to be converging.

The mirrors are set to reflect the optical signals 404 incident on the mirrors at the prescribed angle of 90 degrees. The 90 degree angle is selected so that the optical signals 404 will be directed to a receiving optical transceiver array in optical communication with the optical transceiver array 406. Error that results from the optical signals 404 having been reflected off the mirrors and traveling along a direction that is not parallel to the line formed by the angle of refraction by the mirrors is compensated for by a tilting of the mirrors so long as the deviation angle of the optical signals 404 from the parallel is small compared to the maximum angle at which the mirrors can be tilted.

The foregoing detailed description is merely illustrative and is not intended to limit examples and/or application or uses of examples. Furthermore, there is no intention to be bound by any expressed or implied information presented in the preceding Background or Summary sections, or in the Detailed Description section.

As used in the specification and the appended claims, the singular forms "a," "an," and "the" are intended to include the plural forms as well, unless the context clearly indicates otherwise.

Unless otherwise indicated, any element, property, feature, or combination of elements, properties, and features, may be used in any example disclosed herein, regardless of whether the element, property, feature, or combination was explicitly disclosed in the example. It will be readily understood that features described in relation to any particular aspect described herein may be applicable to other aspects described herein provided the features are compatible with that aspect. In particular, features described herein in relation to the method may be applicable to the optical data transfer product and vice versa.

Reference throughout this specification to "one example," or "an example," means that a particular feature, structure, or characteristic described in connection with the example is included in at least one example. Thus, the appearances of the phrase "in one example," "in one aspect," or "in an example," in various places throughout this specification are not necessarily all referring to the same example. Furthermore, the particular features, structures, or characteristics may be combined in any suitable manner in one or more examples.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The above description includes non-limiting aspects of the various examples. It is, of course, not possible to describe every conceivable combination of components or methods for purposes of describing the disclosed subject matter, and one skilled in the art may recognize that further combinations and permutations of various examples are possible. The disclosed subject matter is intended to embrace all such alterations, modifications, and variations that fall within the spirit of the appended claims.

With regard to the various functions performed by the above described components, the terms (including a reference to a "means") used to describe such components are intended to also include, unless otherwise indicated, any structure(s) which performs the specified function of the described component (e.g., functional equivalent), even if not structurally equivalent to the disclosed structure. In addition, while a particular feature of the disclosed subject matter may have been disclosed with respect to only one of several implementations, such feature may be combined with one or more features of the other implementations as may be desired and advantageous for any given or particular applications.

The terms "exemplary" and/or "demonstrative" as used herein are intended to mean serving as an example, instance, or illustrative. For the avoidance of doubt, the subject matter disclosed herein is not limited to such examples. In addition, any aspect or design described herein as "exemplary" and/or "demonstrative" is not necessarily to be construed as preferred or advantageous over the other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

What is claimed is:

1. An optical transmission device comprising:
an optical slip ring defining a central axis and having a cavity;
a first optical transceiver proximate a first side of the cavity of the optical slip ring for propagating a data signal at a first wavelength through the cavity of the optical slip ring;
a second optical transceiver proximate a second side of the cavity of the optical slip ring for propagating the data signal at the first wavelength, wherein the second optical transceiver revolves about the central axis of the optical slip ring on a gimbal assembly;
a first optical device arranged with a tilt angle relative to a first optical beam of the first optical transceiver and proximate to the first side of the cavity of the optical slip ring, wherein the first optical device is coated with a film comprising a wavelength selective coating for reflecting the data signal at a reflection angle; and
a second optical device positioned at the tilt angle relative to a second optical beam of the second optical transceiver, wherein the second optical device rotates in relation to the revolving of the second optical transceiver, the second optical device is coated with the film comprising the wavelength selective coating for reflecting the data signal at the reflection angle to the first optical device, wherein the first optical transceiver is in optical communication with the second optical transceiver, and wherein an external light source propagates an external beam at a second wavelength through the cavity of the optical slip ring, wherein the external beam transmits through the wavelength selective coating of the film coating of the first optical device and transmits through the wavelength selective coating of the film the film coating of the second optical device, wherein:
the wavelength selective coating of the first optical device and the wavelength selective coating of the second optical device concurrently reflect the data signal at the first wavelength and transmit the external beam at the second wavelength through a same region of the wavelength selective coating; and
the external beam maintains a substantially linear path along the central axis as the external beam transmits through the wavelength selective coating of the first optical device and the wavelength selective coating of the second optical device.

2. The optical transmission device of claim 1, wherein the first and second optical devices comprise alternating layers of material having an optical thickness of 0.25 and 0.50 of a wavelength of the data signal.

3. The optical transmission device of claim 1, wherein the film of the first and second optical devices is a dielectric material.

4. The optical transmission device of claim 1, wherein the film of the first and second optical devices has the same index of refraction.

5. The optical transmission device of claim 1, wherein the first optical device and/or the second optical device is positioned off the central axis of the optical slip ring to accommodate for a deviation due to refraction of the data signals of the first and second optical transceivers, and wherein a calibration signal is propagated from the second optical transceiver to the first optical transceiver at a third wavelength.

6. The optical transmission device of claim 1, wherein the first optical transceiver is positioned on a first printed circuit board of a first optical transceiver mount, and wherein the second optical transceiver is positioned on a second printed circuit board of a second optical transceiver mount.

7. The optical transmission device of claim 6, wherein the first and second optical transceivers are 5 millimeters cubed or less in size.

8. The optical transmission device of claim 1, wherein the first optical beam of the first optical transceiver expands as the first optical beam travels towards the second optical transceiver to allow for the first and second optical transceivers to remain in optical communication independent from a rotational state of the second optical transceiver.

9. An optical transmission device comprising:
an optical slip ring defining a central axis and having a cavity;
a first set of optical transceivers proximate a first side of the cavity of the optical slip ring for propagating three or more data signals through the cavity of the optical slip ring;
a second set of optical transceivers proximate a second side of the cavity of the optical slip ring for propagating the three or more data signals, wherein the second set of optical transceivers revolve about the central axis of the optical slip ring on a gimbal assembly;
a first optical device arranged with a tilt angle relative to a first set of optical beams of the first set of optical transceivers and proximate to the first side of the cavity of the optical slip ring, wherein the first optical device is coated with a film comprising a wavelength selective coating for reflecting the three or more data signals at a reflection angle; and
a second optical device positioned at the tilt angle relative to a second set of optical beams of the second set of optical transceivers, wherein the second optical device rotates in relation to the revolving of the second set of optical transceivers, the second optical device is coated with the film comprising the wavelength selective coating for reflecting the three or more data signals at the reflection angle to the first optical device, wherein the first set of optical transceivers is in optical communication with the second set of optical transceivers, and wherein an external light source propagates an external beam at a second wavelength through the cavity of the optical slip ring, wherein the external beam transmits through the wavelength selective coating of the film coating through the film coating of the first optical device and transmits through the wavelength selective coating of the film coating the film coating of the second optical device, wherein:
the wavelength selective coating of the first optical device and the wavelength selective coating of the second optical device concurrently reflect the three or more data signals and transmit the external beam at the second wavelength through a same region of the wavelength selective coating; and
the external beam maintains a substantially linear path along the central axis as the external beam transmits through the wavelength selective coating of the first optical device and the wavelength selective coating of the second optical device.

10. The optical transmission device of claim 9, wherein the first and second optical devices comprise alternating layers of material having an optical thickness of 0.25 and 0.50 of a wavelength of the three or more data signal.

11. The optical transmission device of claim 9, wherein the film of the first and second optical devices is a dielectric material.

12. The optical transmission device of claim 11, wherein the film of the first and second optical devices has the same index of refraction.

13. The optical transmission device of claim 9, wherein the first optical device and/or the second optical device is positioned off the central axis of the optical slip ring to accommodate for a deviation due to refraction of the three or more data signals of the first and second optical transceivers, and wherein the three or more data signals are propagated from the second optical transceiver to the first optical transceiver.

14. The optical transmission device of claim 9, wherein the first set of optical transceivers are positioned on a first printed circuit board of a first optical transceiver mount, and wherein the second set of optical transceivers are positioned on a second printed circuit board of a second optical transceiver mount.

15. The optical transmission device of claim 9, wherein the first set of optical beams of the first set of optical transceivers expand as the first set of optical beams travel towards the second set of optical transceivers to allow for the first and second set of optical transceivers to remain in optical communication independent from a rotational state of the second set of optical transceivers, and wherein the first set of optical beams converge at the second set of optical transceivers.

16. An avionics system comprising:
a countermeasure component configured to propagate a laser beam from an aircraft; and
an optical transmission component comprising:
an optical slip ring defining a central axis and having a cavity,
a first optical transceiver proximate a first side of the cavity of the optical slip ring for propagating a data signal through the cavity of the optical slip ring;
a second optical transceiver proximate a second side of the cavity of the optical slip ring for propagating the data signal, wherein the second optical transceiver revolves about the central axis of the optical slip ring on a gimbal assembly;
a first optical device arranged with a tilt angle relative to a first optical beam of the first optical transceiver and proximate to the first side of the cavity of the optical slip ring, wherein the first optical device is coated with a film comprising a wavelength selective coating for reflecting the data signal at a reflection angle; and a second optical device positioned at the tilt angle relative to a second optical beam of the second optical transceiver, wherein the second optical device rotates in relation to the revolving of the second optical transceiver, the second optical device is coated with the film comprising the wavelength selective coating for reflecting the data signal at the reflection angle to the first optical device, wherein the first optical transceiver is in optical communication with the second optical transceiver, and wherein the laser beam transmits through the wavelength selective coating of the film coating through the cavity of the optical slip ring, wherein the laser beam passes through the film coating of the first optical device transmits through the wavelength selective coating of the film coating and the film coating of the second optical device, wherein the wavelength selective coating of the first optical device and the wavelength selective coating of the second optical device concurrently reflect the data signal at the first wavelength and transmit the laser beam at the second wavelength through a same region of the wavelength selective coating, and wherein the laser beam maintains a substantially linear path along the central axis as the laser beam transmits through the wavelength selective coating of the first optical device and the wavelength selective coating of the second optical device.

17. The avionics system of claim 16, wherein the first optical device and/or the second optical device is positioned off the central axis of the optical slip ring to accommodate for a deviation due to refraction of the data signal from the first optical transceiver to the second optical transceiver, and wherein a calibration signal is propagated from the second optical transceiver to the first optical transceiver at a third wavelength.

18. The avionics system of claim 16, wherein the first optical transceiver is positioned on a first printed circuit board of a first optical transceiver mount, and wherein the second optical transceiver is positioned on a second printed circuit board of a second optical transceiver mount.

19. The avionics system of claim 17, wherein the first optical beam of the first optical transceiver expands as the first optical beam travels towards the second optical transceiver to allow for the first and second optical transceivers to remain in optical communication independent from a rotational state of the second optical transceiver.

20. The avionics system of claim 17, further comprising:
a navigation component communicatively coupled to the countermeasure system to provide orientation information of the aircraft; and
a power component for providing power to the countermeasure component and the navigation component.

* * * * *